Oct. 4, 1938.    L. F. QUINN    2,132,320
PARING KNIFE
Original Filed Sept. 26, 1936
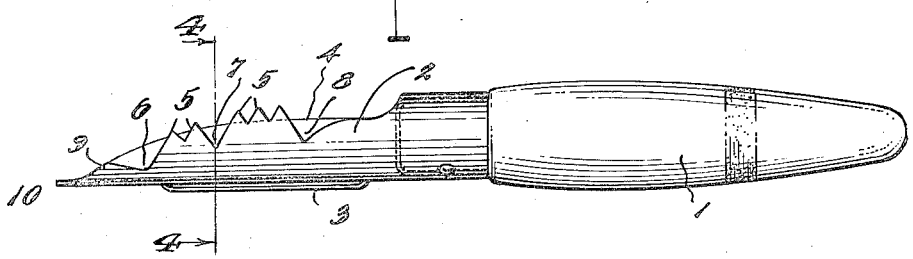
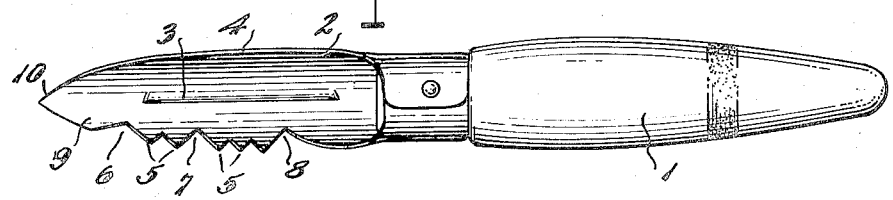
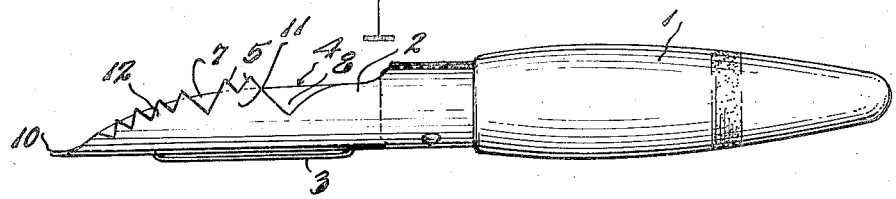
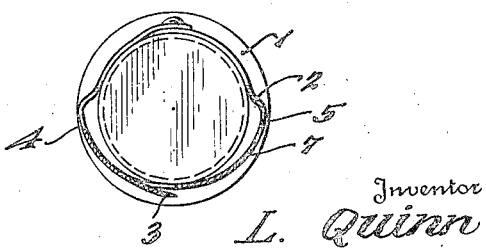
Inventor
L. Quinn
By Robb & Robb
Attorneys Patented Oct. 4, 1938

2,132,320

UNITED STATES PATENT OFFICE 2,132,320

PARING KNIFE

Leo F. Quinn, Vina, Calif.

Application September 26, 1936, Serial No. 102,787
Renewed July 18, 1938

1 Claim. (Cl. 30—279)

This invention appertains to implements or culinary articles for preparing fruits, vegetables, and the like, and more particularly to that class of implements known as paring knives or pulping instruments which are used for removing the skin or rind from the fruit or vegetable and for pulping the meat or flesh thereof.

As illustrated in the accompanying drawing and hereinafter described, my invention may be embodied in a paring implement of the type which comprises a trough-shaped or transversely arcuate blade having a longitudinal cutting edge offset from an intermediate portion of the body of the blade, one of the lateral edges of the blade being provided with pulping serrations. In the well known form of this implement, the serrations just mentioned are continuous from the handle end of the blade to approximately the tip of the blade body. The trough shape of the blade is primarily useful for removing the cores of fruits and vegetables, and the serrations facilitate such removal when a sawing motion is imparted to the implement, which sawing motion may also be attended by a turning or twisting of the blade about the longitudinal axis of the same. The serrations thus may be useful for other purposes, in addition to their use for pulping operations, but in their conventional form, they are not suitably adapted for removing relatively small portions of the fruit or vegetable, such as potato eyes, decayed or bruised spots, specks, etc., because of the waste which normally attends the operation when attempts are made to use the serrated edge of the implement for this purpose. In other words, the serrated edge of the blade can not be used to gouge or dig out a potato eye or a spot without also digging out a substantial portion of the good parts of the fruit or vegetable, as the case may be, adjacent to the portion which it is desired to remove.

With the above in mind, it is an object of the present invention to provide an improved implement which will eliminate, to a substantial degree, the usual waste normally attending the removal of potato eyes, spots, specks, and other small portions of fruits, vegetables, and the like which are not fit for consumption, while at the same time enabling the same to be removed with despatch and a minimum of effort. While the invention is preferably embodied in a paring implement of the character above described, it is to be understood that it is not confined to this type of implement which has been shown and described merely by way of example.

More specifically, the invention consists of a blade member having pulping serrations formed on one edge thereof, the serrations being arranged in one or more relatively short groups of only a few serrations per group. In the case where more than one group of serrations is employed, the groups are spaced apart, according to my invention, by a recess or recesses extending into the blade beyond the base of the serrations, whereby to permit the use of a single group of serrations for gouging or digging purposes, without resulting in gouging out adjacent portions of the material by the remaining serrations.

Other objects and advantages of the invention will be hereinafter described and the novel features thereof defined by the appended claim.

In the drawing,—

Figure 1 is a view in side elevation of a paring implement having my invention embodied therein;

Figure 2 is a top plan of the implement shown in Figure 1;

Figure 3 is a view in side elevation of an implement generally similar to that of Figures 1 and 2, but embodying a slightly modified form of my invention; and Figure 4 is a sectional view taken approximately on the line 4—4 of Figure 1.

Referring first to the embodiment illustrated in Figures 1, 2 and 4, which has been illustrated by way of example only, 1 denotes a handle having mounted thereon a blade member, generally designated 2. The blade member is more or less transversely arcuate or curved, and is provided at an intermediate portion in the body thereof with an offset cutting edge or knife 3. One of the longitudinally-extending lateral edges 4 of the blade member 2 is plain, while the other edge is provided with pulping serrations, generally designated 5. My invention is characterized by an improved and novel arrangement of these pulping serrations, as will hereinafter be more fully pointed out, and, with this exception, the implement conforms to a well known commercial article of manufacture.

According to my invention, the pulping serrations 5 are arranged in a plurality of relatively short longitudinally spaced groups, although it is to be understood that a single short group may be provided, if desired, instead of several groups. At each end of each short group of serrations, there is provided a recess in the blade member 2, as at 6, 7 and 8, and these recesses extend into the body of the blade member 2 preferably beyond the base of the serrations 5, and serve to space the serration groups apart longitudinally so as to permit any group to be used for gouging purposes without interference of the other group or groups. As best seen in Figures 1 and 2, the first group of serrations nearest the handle end of the blade member 2 is composed of three serrations or teeth, and this group can be used independently of the other serrations and independently of the other parts of the blade member 2, for gouging out a potato eye or other small portion of the fruit or vegetable, without any waste of the good portions of the fruit or vegetable due to inadvertent gouging by the other serrations, the recesses or notches 7 and 8 separating this group of serrations from the other serrations so as to afford a substantially independent group. The next group of serrations, to the left of the first group, as viewed in the drawing, is composed of two serrations or teeth, and this group can be used independently of the first group, as will be readily understood, by reason of the independent separation of the groups by the recesses 6 and 7. The recess 6 forms a more or less blunt or coarse single tooth or serration 9 adjacent the tip or free end 10 of the blade member 2, which can likewise be used independently of the other serrations, as desired. Of course, the entire serrated edge, or a substantial part thereof, can be used in the ordinary manner of those implements which have a continuously serrated or uninterrupted serrated edge, for pulping purposes.

It will be readily understood that the implement, when grasped by the handle 1, can be used as a paring implement in the well known manner by bringing the knife or cutting edge 3 into engagement with the fruit or vegetable, or whatever the object may be that is to be pared, and manipulated in the well known manner to remove the skin or rind. On the other hand, cores can be removed by inserting the implement endwise into the fruit or vegetable and rotating the implement and/or the fruit or vegetable around the core so as to cause the serrated edge of the blade member 2 to sever the core from the remainder of the material.

To remove potato eyes, spots, and the like, a selected group of serrations is engaged with the fruit or vegetable so as to gouge out the portion which it is desired to be removed, as by imparting to the implement a quick twisting motion in the nature of a partial rotation of the blade member 2 about the longitudinal axis of the implement by a turning of the wrist.

It will be readily apparent that my invention is particularly adapted to implements of the general character shown in the drawing, inasmuch as the serrations can be divided into relatively short spaced groups without materially increasing the cost of manufacture of the implement, and with little, if any, change from the standard manufacturing practices. In other words, the blade member 2 can be made with a continuous row of uninterrupted serrations, in the same manner as heretofore, and certain of the serrations subsequently removed, as by filing or grinding, to provide the recesses 6, 7 and 8. On the other hand, the formation of the recesses 6, 7 and 8 may be formed in the initial stamping or forming operation of the blade member.

It is to be understood that I do not wish to be limited to the precise number of serrations in each group as shown, as this may be varied as desired. The different groups may have different numbers of serrations or teeth, as illustrated in Figures 1 and 2, in which event, the group selected for a particular gouging operation can be governed according to the amount of material which is to be gouged out, or according to convenience.

In the modified form illustrated in Figure 3, the construction is generally the same as illustrated in Figures 1 and 2, with the exception that the recess 6 of Figures 1 and 2 is omitted. The serrations of Figure 3 are thus formed in a single relatively short group 11, and a somewhat longer group 12, the latter being located adjacent to the tip or free end 10 of the blade member 2. As previously mentioned, the order or arrangement of the groups or serrations may be varied as desired.

The use of the serrations of the form illustrated in Figure 3 will be readily understood from reference to the description of the form illustrated in Figures 1 and 2. In either case, the implement can not only be more effectively used for removing potato eyes and other small portions of material, but also for pulping the material in the usual manner.

While the details of construction have been herein shown and described, the invention is not confined thereto as changes and alterations may be made without departing from the spirit thereof as defined by the appended claim.

Having thus described my invention, what I claim and desire to secure by Letters Patent is:

An implement for preparing fruits, vegetables, and the like, comprising a handle, a transversely arcuate blade member mounted on the handle and having a longitudinally-extending cutting edge, formed at an intermediate portion of the body thereof, one of the longitudinal edges of the blade member being serrated, and the serrations being arranged in longitudinally spaced groups of different widths and number of serrations, the points of the serrations lying in a curve extending substantially from the point to the handle, the space between the groups having the form of a recess extending into the body of the blade member beyond the base of the serrations aforesaid.

LEO F. QUINN.